US007406496B2

(12) United States Patent
St. Pierre

(10) Patent No.: US 7,406,496 B2
(45) Date of Patent: Jul. 29, 2008

(54) SYSTEM AND METHOD FOR PROCESSING CALLBACK REQUESTS, WHICH INCLUDE A CLIENT PORT AND ADDRESS, INCLUDED IN WEB-BASED PROCEDURE CALLS

(75) Inventor: Robert P. St. Pierre, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 729 days.

(21) Appl. No.: 10/205,124

(22) Filed: Jul. 24, 2002

(65) Prior Publication Data

US 2004/0019682 A1    Jan. 29, 2004

(51) Int. Cl.
    *G06F 13/00* (2006.01)
(52) U.S. Cl. ..................................... 709/203
(58) Field of Classification Search ............... 709/203, 709/221
    See application file for complete search history.

(56) References Cited

U.S. PATENT DOCUMENTS

| 5,845,077 | A  | * | 12/1998 | Fawcett ........................ 709/221 |
| 6,941,562 | B2 | * | 9/2005  | Gao et al. ..................... 719/330 |
| 7,028,312 | B1 | * | 4/2006  | Merrick et al. ................ 719/330 |
| 2002/0129108 | A1 | * | 9/2002  | Sykes, Jr. ..................... 709/206 |

* cited by examiner

Primary Examiner—Robert B Harrell
(74) Attorney, Agent, or Firm—Sonnenschein Nath & Rosenthal LLP

(57) ABSTRACT

A method of utilizing transport protocols to provide bidirectional web procedure calls is disclosed. A callback request included with a web procedure call provides a destination address and port on the requesting device to be utilized in a new connection for receiving the response from the receiving device. The utilization of a callback request included with a web procedure call enables a receiving device to terminate the original connection upon which it received the web procedure call while performing the requested procedure. In situations where the requested procedure takes an extended period of time or the receiving device is responding to a large number of requests, the ability to drop the original connection, perform the procedure, and respond to the requesting device via a new connection saves resources on the receiving device. Replies to the request are sent to the requesting device utilizing the destination address and port included as a parameter in the callback request. Access to the receiving device is increased as connections do not need to be held open.

17 Claims, 4 Drawing Sheets

SYSTEM AND METHOD FOR PROCESSING CALLBACK REQUESTS, WHICH INCLUDE A CLIENT PORT AND ADDRESS, INCLUDED IN WEB-BASED PROCEDURE CALLS

FIELD OF THE INVENTION

The illustrative embodiment of the present invention relates generally to web-based procedure calls and more particularly to web based procedure calls containing callback requests.

RELATED APPLICATIONS

The illustrative embodiment of the present invention is related to four co-pending applications: U.S. Publication No. 2004/0019804, "A System and Method For Processing Callback Requests Included in Web-Based Procedure Calls Through a Firewall"; U.S. Publication No. 2004/0019678, "A System and Method for Forward Chaining Web-Based Procedure Calls": U.S. Publication No. 2004/0019633. "MIME Encoding of Values for Web Procedure Calls; and U.S. Publication No. 2004/0019636, "System and Method for Dynamically Routing Web Procedure Calls" filed concurrently with the present application.

BACKGROUND

Transport protocols enable distributed devices on a network to request services from remote devices. In a typical scenario, a client device sends a request or procedure call over a network to a server via a transport protocol such as the Hyper Text Transport Protocol (HTTP). The transport protocols are connection-based and require a connection to remain open between the requesting client device and the receiving server until the requested action has been performed and the response has been returned to the client device.

The use of transport protocols works very well for simple requests (i.e.: a request that does not take very long to handle ) and for situations where the number of requesting devices is limited. Socket connections are established and terminated quickly for simple requests. Requests or procedure calls which take longer to execute do not degrade system performance significantly if they occur in limited numbers. Unfortunately, the conventional use of transport protocols does not handle time-intensive procedure requests from large numbers of requesting devices well. The requirement of keeping the connection open between the requesting device and the receiving device represents a major resource drain for the receiving device which can quickly exhaust the number of available connections. The absence of available connections prevents additional devices from accessing the receiving device.

SUMMARY OF THE INVENTION

The illustrative embodiment of the present invention provides a method of processing callback requests included in web procedure calls. A web procedure call is a procedure call made over a network to a server or other electronic device. The procedure call includes the name of the procedure, and alternately one or more parameters required for the execution of the procedure. A requesting device contacts a receiving device and requests the performance of a procedure. The procedure call includes a callback request. The callback request includes a destination address and port on the requesting device. The receiving device parses the procedure call and identifies the requested service and the callback request. After identifying the callback request, the receiving device terminates the connection with requesting device. The receiving device executes the procedure and then requests a new connection to the requesting device once the results of the requested service are obtained. The new connection request utilizes the destination address and port included with the callback request. After the connection is established, the receiving device transmits the results of the requested procedure to the requesting device over the new connection.

In one embodiment, a connection is established over a network between a requesting electronic device and a receiving electronic device. The receiving electronic device receives a request from the requesting electronic device. The request is conveyed via a transport protocol and includes a callback request. The callback request includes a destination address and port on the requesting device. The receiving electronic device terminates the connection, and performs the procedure specified in the request. The receiving device sends a request for a new connection to the requesting device specifying the destination address and port included in the callback request. Following the establishment of the new connection, the receiving electronic device transmits the results of the requested operation over the new connection.

In another embodiment, a connection is established over a network between a requesting electronic device and a receiving electronic device. The requesting electronic device sends a request over the connection to the receiving device. The request utilizes a transport protocol and includes a callback request. The callback request includes a destination address and port on the requesting device. The requesting electronic devices listens on the designated port and establishes a new connection to the receiving device upon receiving a request for a new connection from the receiving device. The requesting electronic device then receives the results of the requested operation over the new connection.

DETAILED DESCRIPTION

The illustrative embodiment of the present invention provides a method of utilizing transport protocols to provide bi-directional web procedure calls. A callback request included with a web procedure call provides a destination address and port on the requesting device to be utilized in a new connection for receiving the response from the receiving device. The utilization of a callback request included with a web procedure call enables a receiving device to terminate the original connection upon which it received the web procedure call while performing the requested procedure. In situations where the requested procedure takes an extended period of time or the receiving device is responding to a large number of requests, the ability to drop the original connection, perform the procedure, and respond to the requesting device via a new connection saves resources on the receiving device. Replies to the request are sent to the requesting device utilizing the destination address and port included as a parameter in the callback request. Access to the receiving device is increased as connections do not need to be held open.

Figure 1:
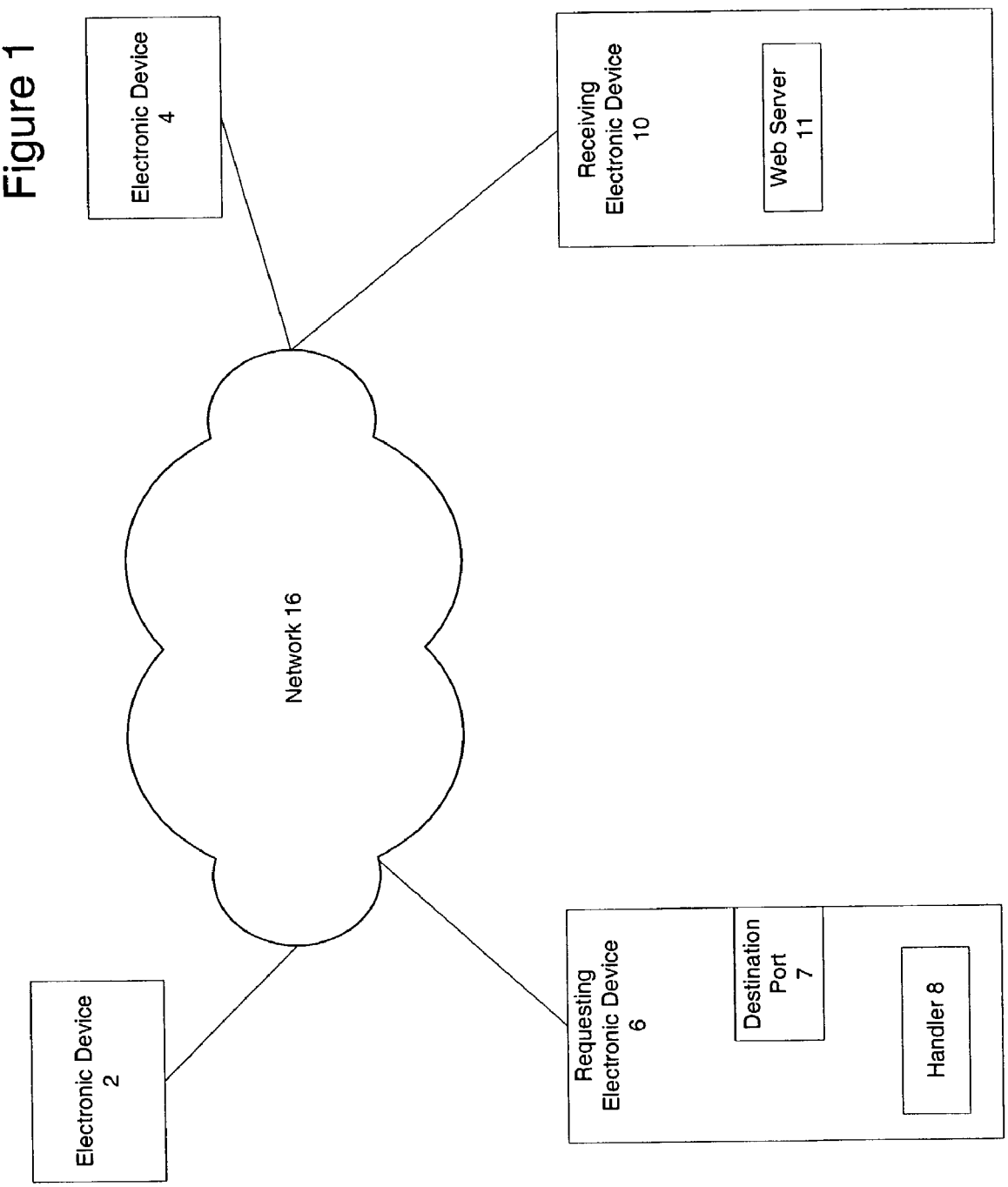
FIG. 1 depicts a block diagram of an environment suitable for practicing the illustrative embodiment of the present invention.

FIG. 1 depicts an environment suitable for practicing an illustrative embodiment of the present invention. A plurality of electronic devices 2, 4, 6, 10 are interfaced with a network 16. The electronic devices may be a desktop computer, a workstation, a PDA, a server, a web server, or other electronic device with a microprocessor interfaced with the network 16. The network 16 may be the Internet, an extranet, an intranet, a wide area network (WAN), a metropolitan area network (MAN), a local area network (LAN), a satellite network, or some other type of network. A requesting electronic device 6 (requesting device) makes a web procedure call over the network 16 to a receiving device 10. The receiving device includes a web server component 11. The web procedure call utilizes a transport protocol, such as the Hyper Text Transport Protocol (HTTP), to submit a request (such as an HTTP request message) and includes a callback request (such as an HTTP response message) which specifies a destination address and port 7 on the requesting device. The requesting device 6 may include a handler 8 for receiving the results of the requested procedure from the receiving device 10. The electronic devices 2, 4, 6 and 10 may be arranged in a client-server architecture, peer-to-peer architecture or some other type of architecture.

The illustrative embodiment of the present invention provides a method of utilizing transport protocols that results in a more efficient use of resources on the receiving device. The transport protocol may be HTTP, FTP (File Transport Protocol) or some other type of transport protocol.

Figure 2:
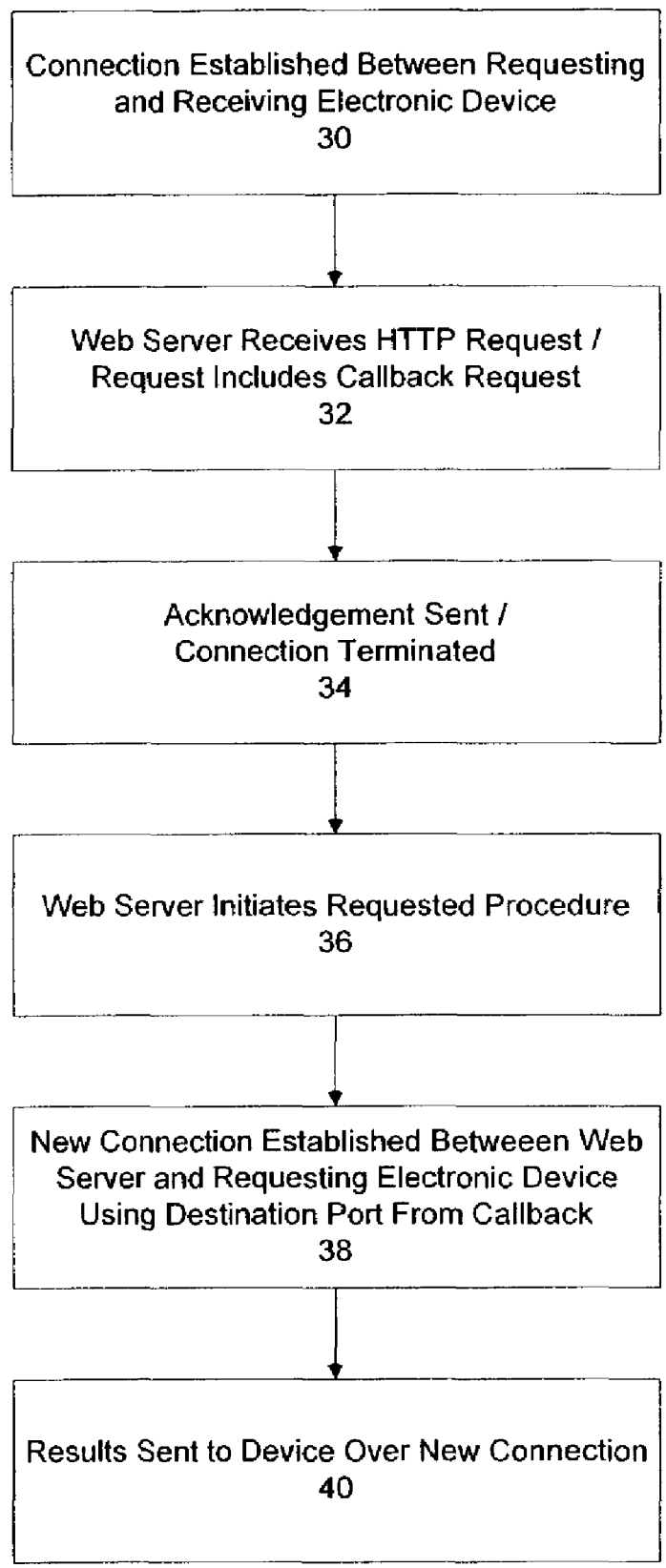
FIG. 2 is a flowchart of the sequence of steps performed by the illustrative embodiment of the present invention to execute callback requests.

FIG. 2 is a flowchart of the sequence of steps utilized by the illustrative embodiment of the present invention to execute callback requests. The sequence begins when a connection is established between a requesting electronic device 6 and a receiving electronic device 10 (step 30). A web server 11 on the receiving electronic device 10 parses the web procedure call and determines that the web procedure call includes a callback request (step 32). A web server is an electronic device, or portion of an electronic device, that delivers web pages to a requesting electronic device. Since the web procedure call includes a callback request, the receiving electronic device sends an acknowledgement and terminates the original connection (step 34). The web server 11 initiates execution of the requested procedure (step 36). Those skilled in the art will recognize that the connection may be terminated after the requested procedure is initiated without departing from the scope of the present invention. Once the procedure has been executed by the web server 11, the receiving device 10 requests the formation of a new connection with the requesting device 6. The new connection is established utilizing the destination address and port on the requesting device 6 that was specified in the callback request (step 38). The results of the web procedure call are then transmitted over the new connection from the receiving device 10 to the requesting device 6 (step 40).

In one embodiment, the web procedure call may be an HTTP GET, POST or PUT request. An HTTP GET request requests the return of the referenced resource. A resource is a piece of information that can be identified by an URI (Uniform Resource Locator). The resource may be a file, a dynamically-generated query result, the output of a CGI script, or something else. An HTTP POST request is used to send data to a receiving device to be processed in some way, such as by a CGI script. A POST request differs from a GET request in that a block of data is sent with the POST request, in the message body. There are usually extra headers to describe this message body, like "Content-Type:" and "Content-Length:". Additionally, a POST request URL does not represent a resource to retrieve, but rater is usually a program to handle the data sent with the request. The response to a POST request is usually a program output, not a static file. The most common use of a POST request is to submit HTML form data to CGI scripts. An HTTP PUT request allows data to be uploaded from the requesting device 6 to to receiving device 10. Those skilled in the art will recognize that there are many other procedures in addition to GET, PUT and POST that may be specified with the callback request without departing from the scope of the present invention.

An example of the use of the callback request of the present invention is a request for information about a stock price. An HTTP request to GET a current stock price will ordinarily be satisfied right away over the original connection used to request the procedure. The URL for such a request would look similar to:

> xxxx://stock.quote.com/getQuote?symbol=SUNW,
> where xxxx means http where stock.quote.com represents the address of the receiving device, getQuote? is the requested operation, and SUNW represents the stock symbol of the company. However, a request to GET the entire stock price history will ordinarily take a long time to fulfill. The illustrative embodiment of the present invention adds a callback request to the GET request so that the receiving device can respond without having to hold open the original connection. The callback request adds the following information to the URL so that it appears as:

> xxxx://stock.quote.com/
> getQuote?symbol=SUNW&callback=http://client.myorg.or:626 2, where xxxx means http The callback request is appended to the end of the URL and indicates that the response to the web procedure call should be sent to the requesting device client.myorg.org at a destination port of 6262. The requesting device will listen at port 6262 for a request for a new connection from the receiving device. The specified port may be the standard web server port 80 or an alternate port number as in the above example. Following the identification of the callback request, the original connection is terminated. By enabling the termination of the original connection, the receiving device can accept additional connections while responding to the GET request. The receiving device parses the procedure call and identifies the request/procedure (GET) and the callback command. Definitions of the procedures and the callback commands are contained in software libraries programmatically consulted by the receiving device at the time of parsing the request.

Figure 3:
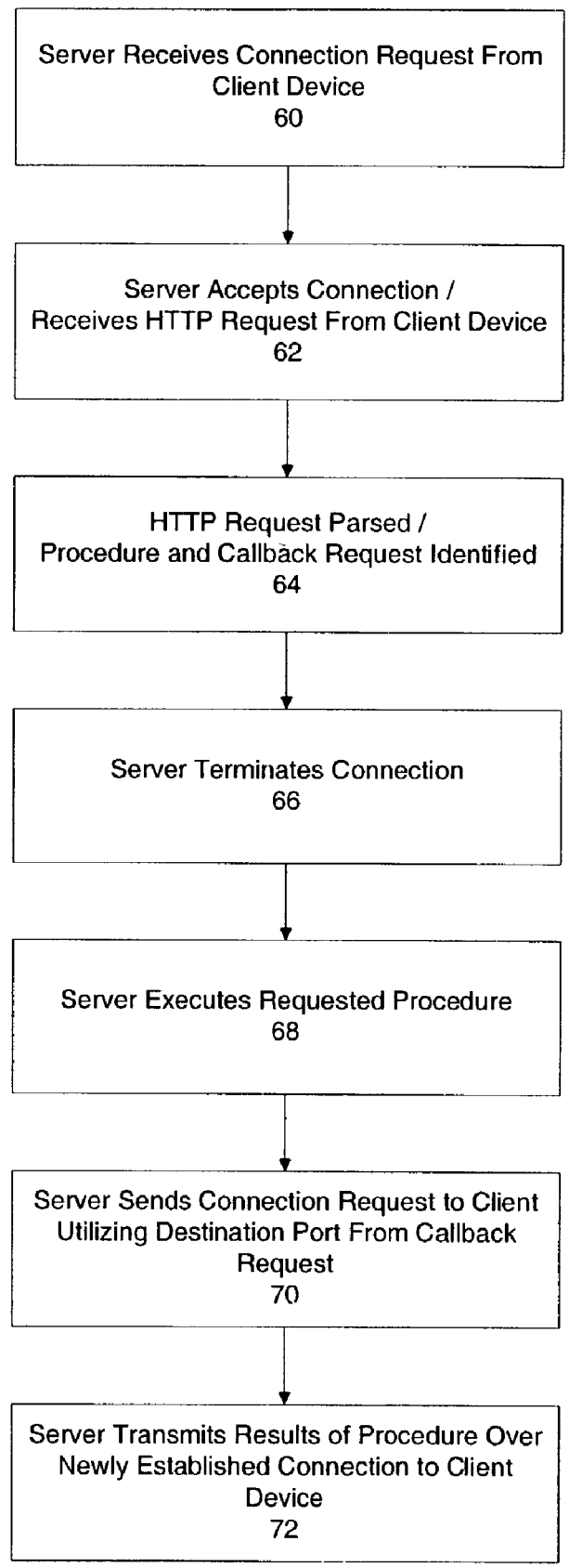
FIG. 3 is a flowchart of the sequence of steps performed by a server receiving an HTTP request with an included callback request.

FIG. 3 is a flowchart of the sequence of steps performed by a web server 11 receiving an HTTP request with an included callback request. The sequence begins when the web server 11 receives a connection request from the requesting device 6 (step 60). The web server 11 accepts the connection and receives the HTTP request from the requesting device 6 over the connection (step 62). The web server 11 parses the HTTP request, extracts the commands from the HTTP request, and determines that the web procedure call includes a callback request (step 64). The original connection is broken to save web server resources (step 66). The web server 11 initiates execution of the procedure requested in the HTTP request (step 68). Once the web server 11 has the results of the requested procedure, the web server requests a new connection with the requesting device 6. The request for a new connection specifies the destination address and port on the requesting device that was included in the callback request (step 70). Once the new connection is established (step 70), the server transmits the results of the web procedure call over the new connection to the requesting device (step 72).

The connection may be established between the requesting device and the receiving device by means of a connection request sent to a defined port. Networked electonic devices "listen" at defined ports for connection requests. Those skilled in the art will recognize that the port may be a well-known port traditionally used for certain types of services (i.e. the FTP Port) or may be a privately-defined port agreed upon in advance. The connection request includes header information identifying the requesting device. The receiving device accepts connections with authorized devices and denies connections to non-authorized devices.

The requesting device 6 may create or designate a handler 8 specifically to receive the results of the callback request. The handler 8 is a logical address on the requesting device to which the results of the web procedure call are to be returned. The handler 8 is appended as an additional item to the callback request and is returned as a parameter when the receiving device 10 returns results of the web procedure call. For example, referring to the stock price example above, the requesting device may create or designate the handler history.php to receive the results of the procedure call. The handler is appended to the callback request so that it appears as:

xxxx://stock.quote.com/
getQuote?symbol=SUNW&callback=http://client.myorg.org:626 2/history.php. where xxxx means http http://stock.quote.com/
getQuote?symbol=SUNW&callback=http:/client.myorg.org:6262/ history.php When the response to the GET request is received at port 6262, the information is forwarded to the handler history.php.

Figure 4:
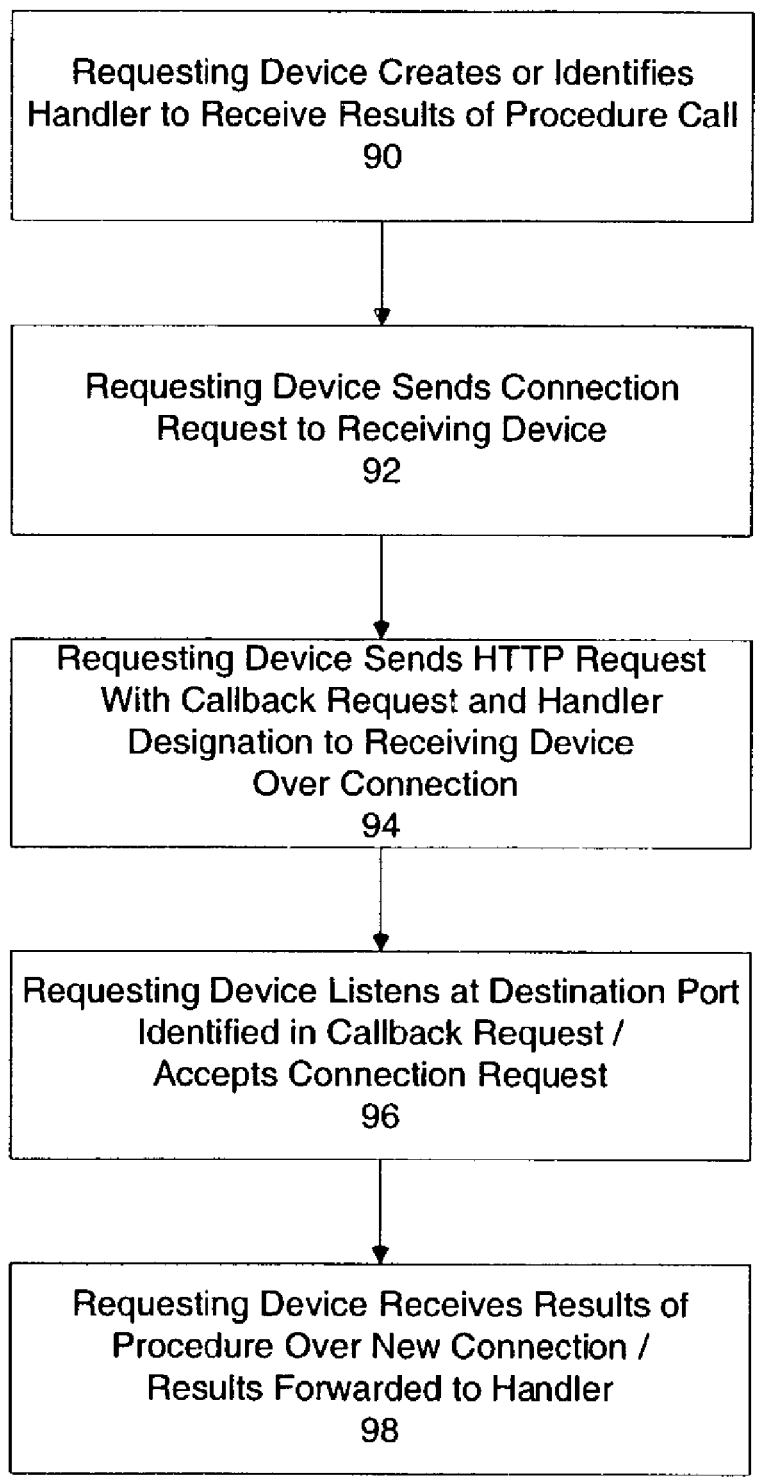
FIG. 4 is a flowchart of the sequence of steps performed by a requesting device to direct a callback request to a created handler in the illustrative embodiment of the present invention.

FIG. 4 is a flowchart of the sequence of steps performed by a requesting device 6 to direct a callback request to a created (or designated) handler 8 in the illustrative embodiment of the present invention. The sequence begins when the requesting device 6 creates or identifies a handler 8 on the requesting device (step 90). The requesting device 6 then requests that the receiving device accept a connection (step 92). The requesting device 6 sends an HTTP request to the receiving device which includes a callback request specifying a destination port and a local handler 8 (step 94). The requesting device 6 then listens on the destination port 7 for the receiving device to request a new connection. When the receiving device 10 requests a new connection, the requesting device accepts the request and establishes the new connection (step 96). The requesting device receives the results of the web procedure call over the new connection with a parameter listing the address of the handle as the destination. The procedure results are forwarded to the handler 8 on the requesting device 6 (step 98).

In one embodiment of the present invention, the request and the response may use different protocols. For example, the request may be made using HTTP and specify an FTP response in the callback request. Those skilled in the art will recognize that a number of different types of protocols for the requests and responses may be utilized without departing from the scope of the present invention.

It will thus be seen that the invention attains the objectives stated in the previous description. Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

I claim:

1. In a network having a plurality of interfaced electronic devices, a method, comprising the steps of:

establishing a connection over said network between a requesting electronic device and a receiving electronic device;

receiving over said connection at said receiving device a request from said requesting device, said request including a callback request, said callback request including a destination port and address on said requesting device;

dissolving said connection between said requesting device and said receiving device;

performing, by said receiving device, an operation specified in said request;

establishing a new connection between said receiving device and said requesting device, said new connection utilizing said destination port and address from said callback request; and transmitting a result of said operation over said new connection to said requesting device from said receiving device, wherein said result of said operation is transmitted in a protocol different from the protocol used in said callback request.

2. The method of claim 1, comprising the further step of:

receiving in said callback request a uniform resource locator (URL) address for a handler on said requesting device, said handler designated to receive the result of said operation.

3. The method of claim 2, comprising the further step of:

establishing said new connection between said receiving device and said requesting device utilizing said destination port.

4. The method of claim 3 wherein the result of said operation is transmitted to said handler at said URL.

5. The method of claim 1 wherein said receiving device includes a web server to respond to web procedure calls.

6. The method of claim 5 wherein said destination port is a well-known port.

7. The method of claim 5 wherein said destination port address is a specified port that is not a well-known port.

8. The method of claim 1 wherein said request is made using a Hypertext Transfer Protocol (HTTP) request.

9. The method of claim 8 wherein said request includes at least one of a PUT request, POST request, and GET request.

10. In a network having a plurality of interfaced electronic devices, a method, comprising the steps of:

establishing a connection over said network between a requesting electronic device and a receiving electronic device;

sending a request from said requesting device over said connection to said receiving device, said request including a callback request, said callback request including a destination port and address on said requesting device;

receiving a result of an operation performed by said receiving device and specified in said request, the result of said operation transmitted from said receiving device over a new connection established between said requesting device and said receiving device, said connection utilizing said destination port and address, wherein said result of said operation is transmitted in a protocol different from the protocol used in said callback request.

11. The method of claim 10, comprising the further steps of:

creating a separate handler on said requesting device to receive the result of said operation, said handler having a unique uniform resource locator (URL) address; and including said URL address in said callback request.

12. The method of claim 11, comprising the further step of:
receiving with said handler the result of said operation.

13. The method of claim 10 wherein said request is an HTTP request.

14. In a network having a plurality of interfaced electronic devices, a computer-readable storage medium, said computer-readable storage medium storing computer-executable steps for a method, said method comprising the steps of:

establishing a connection between a requesting electronic device and a receiving electronic device;

receiving over said connection at said receiving device a request from said requesting device, said request including a callback request, said callback request including a destination port and address on said requesting device;

dissolving said connection between said requesting device and said receiving device;

performing an operation specified in said request;

establishing a new connection between said receiving device and said requesting device, said new connection utilizing said destination port and address from said callback request; and transmitting a result of said operation over said new connection to said requesting device from said receiving device, wherein said result of said operation is transmitted in a protocol different from the protocol used in said callback request.

15. The computer-readable storage medium of claim 14 wherein said receiving device includes a web server for responding to web procedure calls.

16. The computer-readable storage medium of claim 15 wherein said request is an HTTP request.

17. The computer-readable storage medium of claim 14 wherein said method comprises the further step of:

receiving in said callback request a uniform resource locator (URL) address for a handler on said requesting device, said handler designated to receive the result of said operation.

* * * * *